United States Patent [19]

Ogawa

[11] Patent Number: 4,928,611
[45] Date of Patent: May 29, 1990

[54] SEWING MACHINE WITH GUIDE AND IRONING MEANS FOR FOLDING BACK AND PRESSING STITCHED FABRIC MARGINS

[75] Inventor: Yoshitake Ogawa, Kasugai, Japan

[73] Assignee: Brother Kogyo Kabushiki Kaisha, Aichi, Japan

[21] Appl. No.: 433,225

[22] Filed: Nov. 8, 1989

[30] Foreign Application Priority Data

Nov. 15, 1988 [JP] Japan .............................. 63-288497
Nov. 15, 1988 [JP] Japan .............................. 63-288498

[51] Int. Cl.⁵ .......................................... D05B 35/02
[52] U.S. Cl. ................................ 112/217; 112/147; 112/121.11; 38/1 B; 156/580.1
[58] Field of Search ................. 112/217, 147, 136, 2, 112/121.11; 38/1 B; 156/580.1, 580.2

[56] References Cited

U.S. PATENT DOCUMENTS

| | | | |
|---|---|---|---|
| 3,246,616 | 4/1966 | Korioth, III | 112/217 X |
| 3,587,496 | 6/1971 | Timby | 112/217 |
| 3,976,020 | 8/1976 | Aulich et al. | 112/217 |
| 4,098,205 | 7/1978 | Kawashima | 112/217 |
| 4,373,892 | 2/1983 | Kreager et al. | 156/580.1 X |
| 4,495,879 | 1/1985 | Yamamoto | 112/217 |
| 4,633,794 | 1/1987 | Kato | 112/121.11 |
| 4,750,955 | 6/1988 | Haguenier | 156/580.1 X |
| 4,823,713 | 4/1989 | Ogawa et al. | 112/217 |

FOREIGN PATENT DOCUMENTS

| | | |
|---|---|---|
| 179928 | 5/1986 | European Pat. Off. |
| 2015596 | 9/1979 | United Kingdom |
| 2196574 | 5/1988 | United Kingdom |

Primary Examiner—Peter Nerbun
Attorney, Agent, or Firm—Oliff & Berridge

[57] ABSTRACT

A sewing machine provided with guide means and ironing means having an ultrasonic heating means. The guide means folds back the free margins of an upper and lower fabric pieces, and the folded margins are pressed or ironed by the ultrasonic heating means. The ultrasonic heating means includes an ultrasonic horn and an anvil relatively movable toward and away from each other. A thickness detector is provided for detecting a combined thickness of the upper and lower fabric pieces, and control means is also provided for controlling one of the heating energy of the ultrasonic heating means and a distance between the horn and the anvil in response to the detected thickness.

7 Claims, 10 Drawing Sheets

SEWING MACHINE WITH GUIDE AND IRONING MEANS FOR FOLDING BACK AND PRESSING STITCHED FABRIC MARGINS

BACKGROUND OF THE INVENTION.

The present invention relates to a sewing machine having guide means and ironing means for folding back and ironing stitched margins of upper and lower pieces of fabric.

There are known sewing machines including guide means for folding stitched margins of upper and lower fabric pieces which have been sewn by the sewing machine and fed by a fabric feeder, and an ultrasonic heating means for heating and ironing the folded sewn margins. When the upper and lower fabric pieces are fed into an area where they will be heated by the ultrasonic heating means, and are ironed thereby, the electric power supplied to the ultrasonic heating means is controlled so as to be of a constant level.

Since the electric power supplied to the ultrasonic heating means for pressing or creasing the stitched margins is of a constant level, when the stitched margins have an increased thickness due to a stepping region in a sewing process, such a stepped region cannot be ironed and creased effectively.

Further, the ultrasonic heating means generally includes an ultrasonic horn and an anvil which jointly provide a heating region where the upper and lower fabric pieces are supplied and ironed with heat. The distance between the anvil and the ultrasonic horn is adjusted by a manual adjusting means such as a screw in accordance with a total thickness of the upper and lower fabrics.

Since the distance between the anvil and the ultrasonic horn is manually set to a certain value, when the margins of the fabric pieces have a stepped area or the thickness of the fabric varies in a sewing process because of a different kind of fabric used, the pressure applied to the margins of the fabric pieces by the ultrasonic horn also varies, and hence the ironing effect of ultrasonic horn on the fabric margins to crease them is not rendered constant. When the thickness of the fabric varies greatly, the fabric pieces are not smoothly fed through a space defined between the ultrasonic horn and the anvil, but tend to remain therebetween. The fabric pieces thus caught between the ultrasonic horn and the anvil are overheated and burned, thus losing the commercial value of the finished product.

Related technique is disclosed in a commonly assigned U.S. Pat. No. 4,823,713 entitled "Sewing Machine with an Ultrasonic Heater for Folding Back Sewn Edges". In this patent, an ultrasonic horn is employed for heating the folded margins of the upper and lower fabric pieces. With the sewing speed being changed, i.e., with the fabric feeding speed being changed dependent on the change in fabric feed pitch, ultrasonic intensity is varied so as to provide a constant heating energy to the fabrics in spite of the irregular fabric feeding speed. The ultrasonic heating is being made only when the fabrics are moved. In this patent if the total thickness of the upper and lower fabrics is changed, the fabrics cannot undergo uniform heating or ironing. Therefore, relevant inherent drawbacks are still involved in the technique described in the U.S. patent.

Related techniques are also disclosed in other U.S. Pat. Nos. 4,495,879, 4,098,205, 3,976,020, 3,587,496 and 3,246,616, those in which a heating plate is used as a heating means. The heating plate performs thermal conduction directly to the fabrics. However, in such thermal conduction type, it would be rather difficult to abruptly control the heating energy. Further, if the fabrics provide a stepped portion, it would be rather difficult to provide a proper surface contact of the heating plate to the stepped portion.

SUMMARY OF THE INVENTION

It is therefore, an object of the present invention to overcome the above described drawbacks and deficiencies, and to provide an improved sewing machine having guide means for folding back stitched margins of fabric pieces, and ironing means for ironing the folded stitched margins.

Another object of the invention is to provide such sewing machine in which heating energy provided by an ultrasonic heating means of the ironing means is controllable in accordance with a total thicknesses of upper and lower fabrics, or in which distance between a horn and anvil is controllable in accordance with the variation of the total thicknesses.

Still another object of the invention is to provide such sewing machine capable of detecting the thickness of stitched margins of fabric pieces before they are heated by the ultrasonic heating means and of regulating the electric power supplied to the ultrasonic heating means depending on the detected thickness, so that the fabric margins, even if they have a stepped region, will be ironed or creased effectively.

Still another object of the present invention is to detect the thickness of margins of fabric pieces before they are heated by an ultrasonic heating means and to automatically control the distance between an ultrasonic horn and an anvil depending on the detected thickness, thereby preventing the fabric pieces from being caught between the ultrasonic horn and the anvil, and also to uniformize the pressure with which the ultrasonic horn presses the fabric margins, so that the fabric margins will be creased with a constant ironing effect.

To attain these and other objects, according to the present invention, there is provided a sewing machine including: stitching means for stitching upper and lower fabric pieces, feed means for feeding the upper and lower fabric pieces which are stitched together, a guide means for folding back, away from each other, stitched margins of the upper and lower fabric pieces fed by the feed means, the guide means being disposed downstream of a point where the upper and lower fabric pieces are stitched by the stitching means with respect to the direction in which the upper and lower fabric pieces are fed by the feed means, and ultrasonic heating means for ironing the stitched margins of the fabric pieces which have been folded back by the guide means. In such sewing machine, the improvement comprises: fabric thickness detecting means for detecting the thickness of the upper and lower fabric pieces upstream of a point where the upper and lower fabric pieces are heated by the ultrasonic heating means, and for producing a thickness signal representing the detected thickness, determining means for producing a determining signal when a region of the upper and lower fabric pieces which has been detected by the fabric thickness detecting means is fed by the feed means and reaches the point where the upper and lower fabric pieces are heated by the ultrasonic heating means, and control means responsive to the determining signal for producing a control signal to iron and heat the upper and lower fabric pieces depending on the thickness thereof based on the thickness signal from the fabric thickness detecting means and for applying the control signal to the ultrasonic heating means.

According to one embodiment of this invention, there is provided a sewing machine comprising stitching means for stitching upper and lower fabric pieces, feed means for feeding the upper and lower fabric pieces which are stitched together, a guide means for folding back, away from each other, stitched margins of the upper and lower fabric pieces fed by the feed means, the guide means being disposed downstream of a point where the upper and lower fabric pieces are stitched by the stitching means with respect to the direction in which the upper and lower fabric pieces are fed by the feed means, and ultrasonic heating means including an anvil and an ultrasonic horn for ironing the stitched margins of the fabric pieces which have been folded back by the guide means, the sewing machine being characterized by fabric thickness detecting means for detecting the thickness of the upper and lower fabric pieces upstream of a point where the upper and lower fabric pieces are heated by the ultrasonic heating means, and for producing a thickness signal representing the detected thickness, determining means for producing a determining signal when a region of the upper and lower fabric pieces which has been detected by the fabric thickness detecting means is fed by the feed means and reaches the point where the upper and lower fabric pieces are heated by the ultrasonic heating means, and heating control means responsive to the determining signal for producing a heating control signal to iron and heat the upper and lower fabric pieces depending on the thickness thereof based on the thickness signal from the fabric thickness detecting means and for applying the heating control signal to the ultrasonic heating means.

When the thickness of the upper and lower fabric pieces which are stitched together is detected at a prescribed position by the fabric thickness detecting means, the fabric thickness detecting means produces and applies a thickness signal representing the detected thickness to the heating control means.

When the region of the upper and lower fabric pieces which has been detected by the fabric thickness detecting means reaches the point where they will be heated by the ultrasonic heating means, the determining means produces and applies a determining signal to the heating control means. As a result, the heating control means produces a heating control signal to iron and heat the fabric pieces depending on the thickness thereof based on the thickness signal from the fabric thickness detecting means, and applies the heating control signal to the ultrasonic heating means. Therefore, even if the stitched margins of the upper and lower fabric pieces have a stepped portion, the electric power supplied to the ultrasonic heating means is increased to apply a suitable amount of heat to the stepped portion of the fabric pieces.

According to a second embodiment of this invention, there is provided a sewing machine comprising stitching means for stitching upper and lower fabric pieces, feed means for feeding the upper and lower fabric pieces which are stitched together, a guide means for folding back, away from each other, stitched margins of the upper and lower fabric pieces fed by the feed means, the guide means being disposed upstream of a point where the upper and lower fabric pieces are stitched by the stitching means with respect to the direction in which the upper and lower fabric pieces are fed by the feed means, and ultrasonic heating means including an anvil and an ultrasonic horn for ironing the stitched margins of the fabric pieces which have been folded back by said guide means, the sewing machine being characterized by distance adjusting means for adjusting the distance between the anvil and the ultrasonic horn depending on the thickness of the upper and lower fabric pieces, fabric thickness detecting means for detecting the thickness of the upper and lower fabric pieces upstream of a point where the upper and lower fabric pieces are heated by the ultrasonic heating means, and for producing a thickness signal representing the detected thickness, calculating means for calculating a change in the thickness of the upper and lower fabric pieces based on the thickness signal from said fabric thickness detecting means, memory means for storing the calculated change in the thickness, determining means for producing a determining signal when a region of the upper and lower fabric pieces which has been detected by the fabric thickness detecting means is fed by the feed means and reaches the point where the upper and lower fabric pieces are heated by the ultrasonic heating means, and control means responsive to the determining signal for reading the change in the thickness from the memory means and controlling the distance adjusting means based on the change in the thickness to vary the distance between the anvil and the ultrasonic horn.

When the thickness of the upper and lower fabric pieces which are stitched together is detected by the fabric thickness detecting means, the fabric thickness detecting means produces and applies a thickness signal representing the detected thickness to the calculating means. In response to the thickness signal, the calculating means calculates a change in the thickness based on the thickness signal, and stores the change in the thickness in the memory means.

The stitched upper and lower fabric pieces are fed by the feed means and their stitched margins are opened or folded back away from each other by the guide means. Thereafter, when the region of the upper and lower fabric pieces which has been detected by the fabric thickness means reaches the point where they will be heated by the ultrasonic heating means, the determining means produces and applies a determining signal to the control means. As a result, the control means reads the stored change in the thickness form the memory means, and controls the distance adjusting means based on the change in the thickness to vary the distance between the anvil and the ultrasonic horn. Therefore, even if the stitched margins of the upper and lower fabric pieces have a stepped portion or their thickness varies in a sewing process due to a different type of fabric used, the fabric pieces are pressed by the ultrasonic horn under a constant pressure, and hence the ironing effect on the fabric pieces is kept at a constant level.

DETAILED DESCRIPTION OF THE PREFERRED EMBODIMENTS

A first embodiment according to the present invention will hereinafter be described with reference to FIGS. 1 thru 11. First described will be a sewing machine having guide means for folding back stitched margins of fabric pieces and ironing means for heating and ironing the folded margins.

Figure 1:
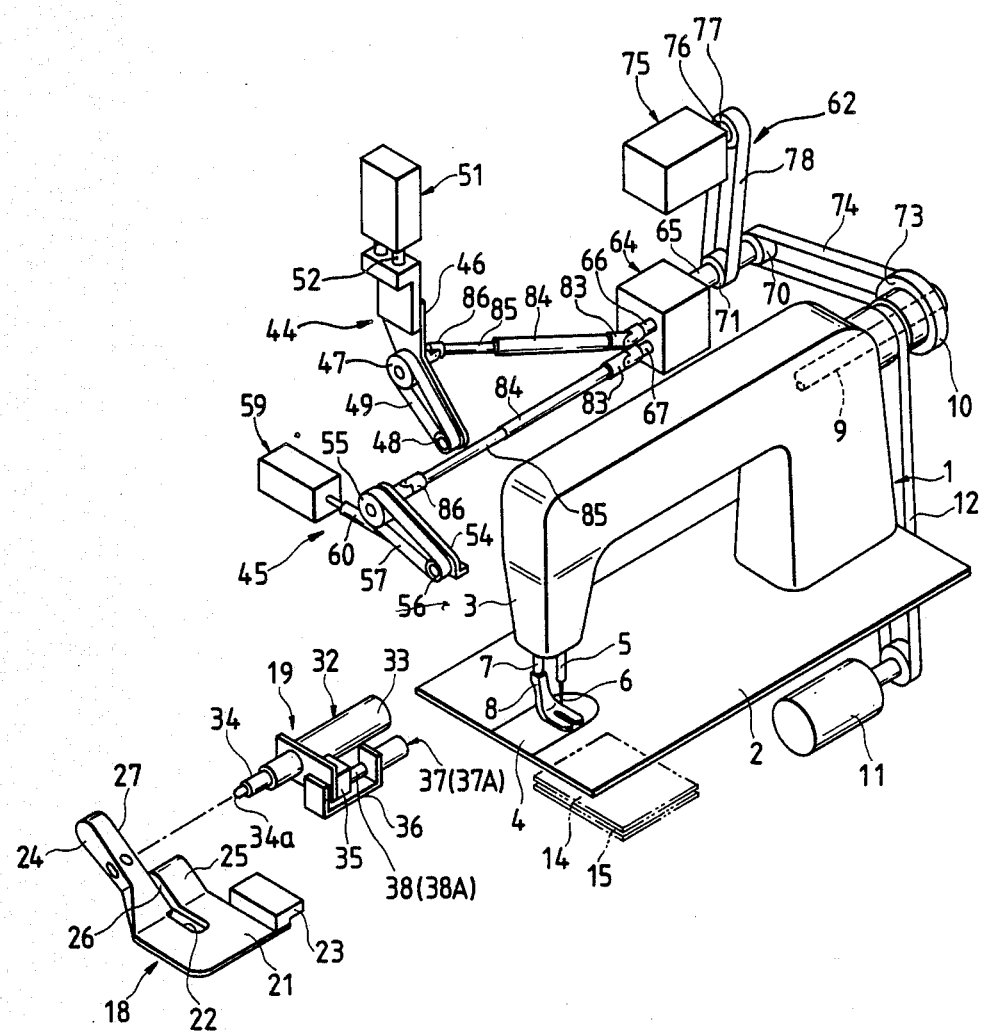
FIG. 1 is an exploded perspective view showing a sewing machine having guide and ironing means according to a first embodiment of this invention.

FIG. 1 is an exploded perspective view of a sewing machine equipped with such guide means for folding back stitched margins of upper and lower pieces of fabric and ironing means for ironing the folded stitched margins. The sewing machine, generally denoted at 1, includes a lock stitch sewing machine having an arm 3 mounted on a bed 2 which has a throat plate 4. The arm 3 houses a main shaft or a spindle 9 rotatably supported therein and having a pulley 10 which is rotatable by a sewing machine driving motor 11 through a drive belt 12. A needle bar 5 which is vertically movable in response to rotation of the main shaft 9 is supported in the distal end of the arm 3. A sewing needle 6 is attached to the lower end of the needle bar 5. A presser bar 7 parallel to the needle bar 7 is also supported in the distal end of the arm 3. A presser foot 8 is attached to the lower end of the presser bar 7.

On the bed 2, there are also mounted a guide means 18 for opening and folding stitched margins of upper and lower pieces 14, 15 of fabric, and an ironing means 19 for ironing the folded stitched margins with heat.

Figure 2:
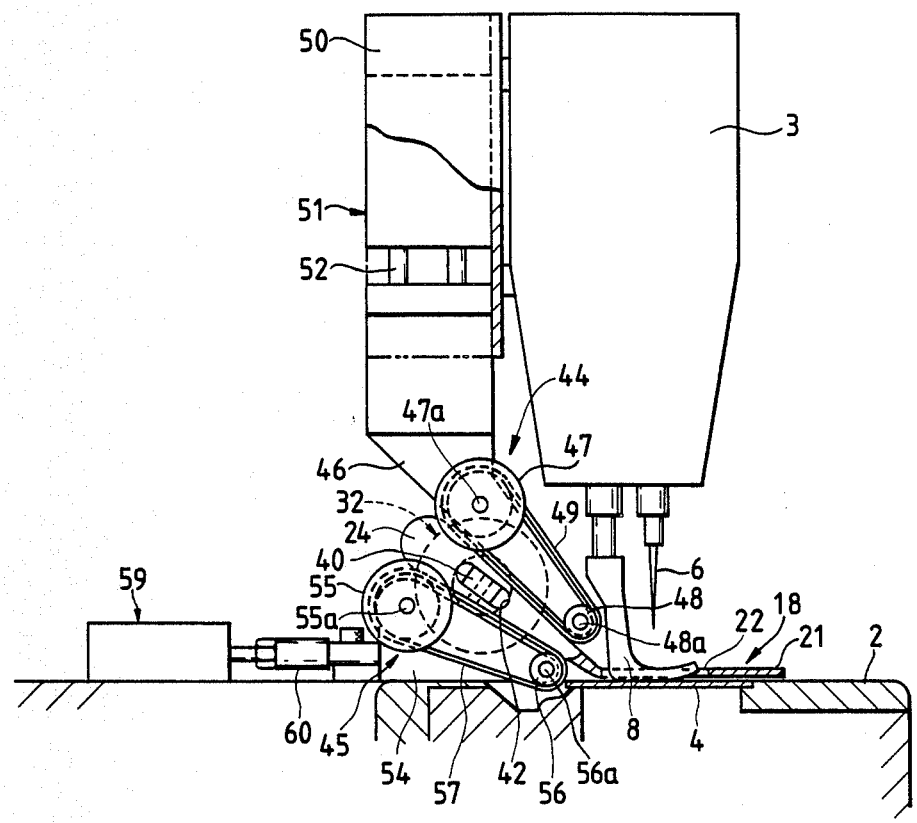
FIG. 2 is a side elevational view of the guide and ironing means and surrounding parts according to the first embodiment of this invention.
Figure 3:
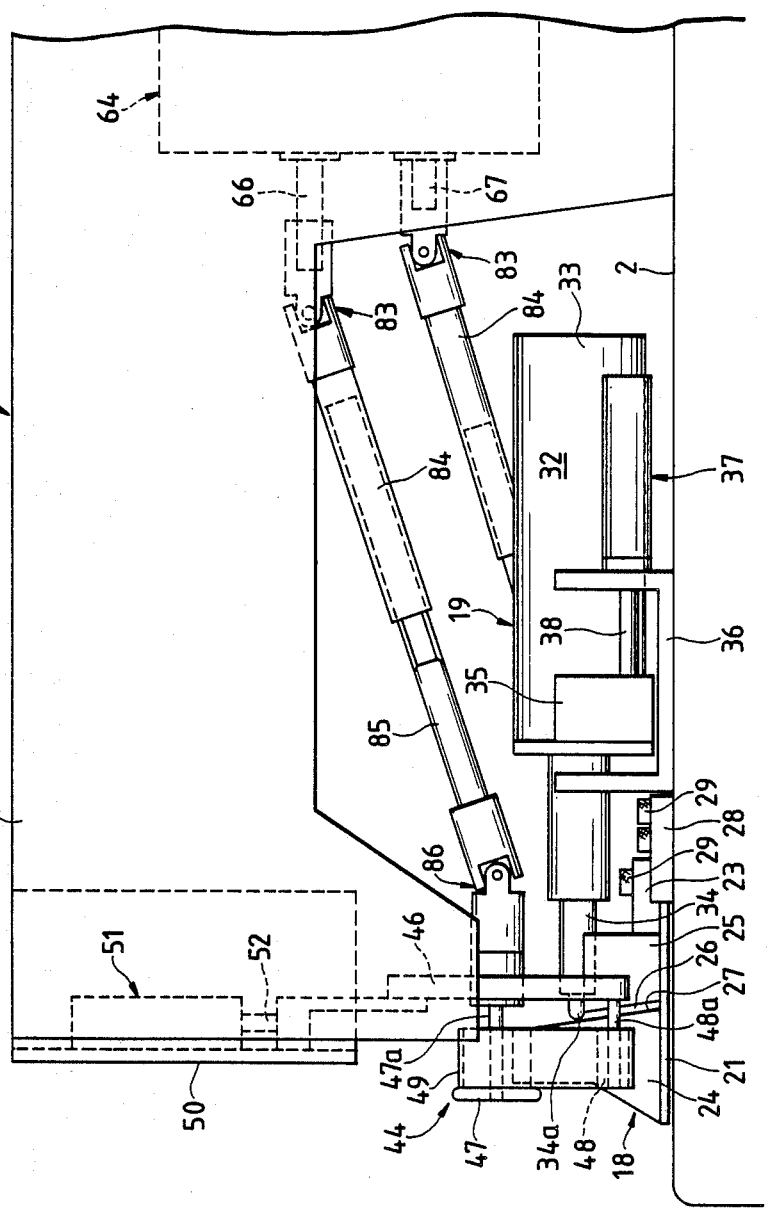
FIG. 3 is a front elevational view of the guide and ironing means and surrounding parts according to the first embodiment of this invention.
Figure 4:
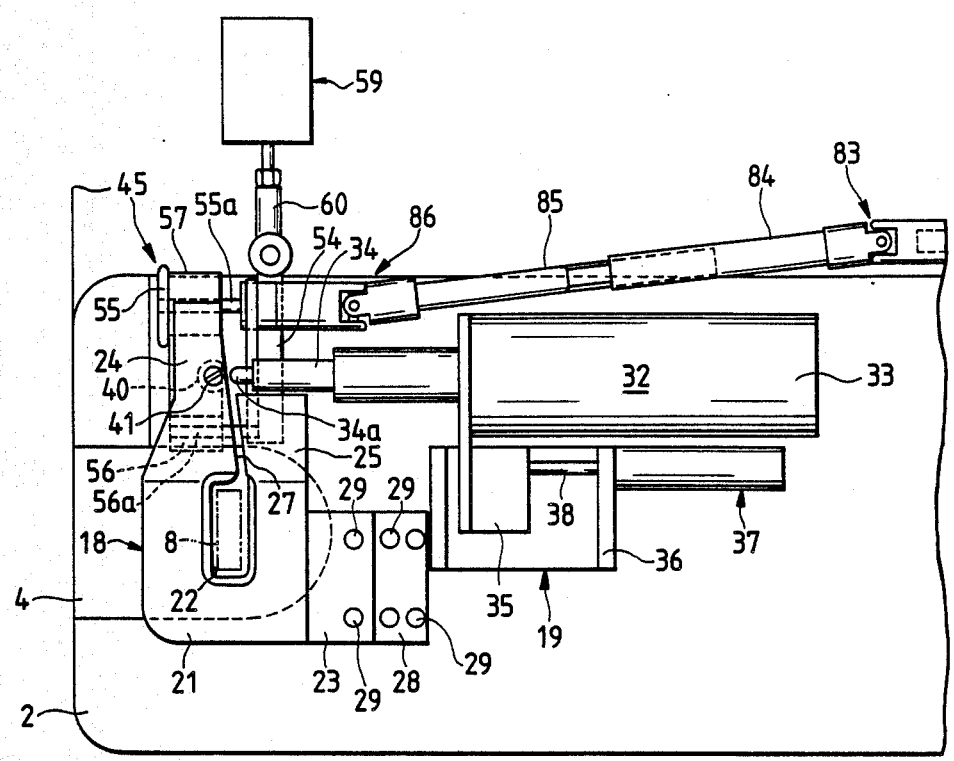
FIG. 4 is a plan view of the guide and ironing means and surrounding parts according to the first embodiment of this invention.
Figure 5:
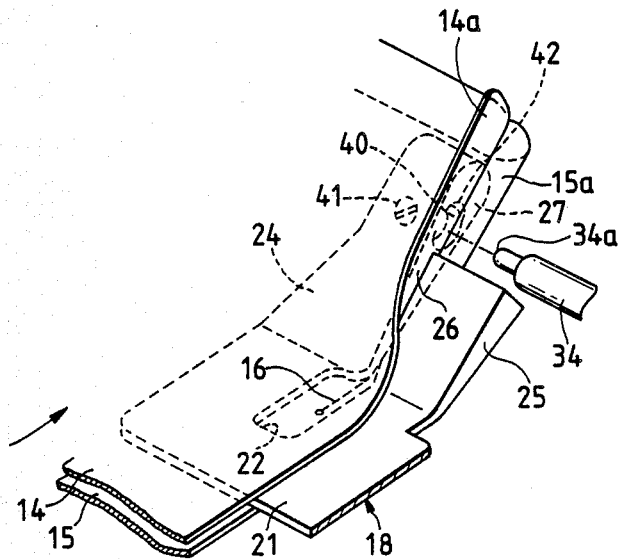
FIG. 5 is a perspective view showing the manner in which upper and lower fabric pieces are opened or spread apart by seam opening members according to the first embodiment of this invention.

FIG. 2 is a side elevational view of the guide and ironing means and surrounding parts, FIG. 3 is a front elevational view thereof, and FIG. 4 is a plan view thereof. As shown in FIGS. 2 through 4, the guide means 18 is in the form of a flat plate and includes a guide plate 21, a mount member 23, a wedge-shaped fabric opening member 24, and a wedge-shaped margin opening member 25. The guide plate 21 has an opening 22 in which the presser foot 8 is positioned. The mount member 23 extends rightwardly from the guide plate 21. The wedge-shaped fabric opening member 24 extends obliquely rearwardly from a lefthand half portion of the guide plate 21. The wedge-shaped margin opening member 25 extends obliquely rearwardly from a righthand half portion of the guide plate 21. A groove 26 is defined between the opening members 24, 25 and communicating with the opening 22.

The mount member 23 is fixed to the bed 2 by an attachment 28 and bolts 29, with a gap for the passage of the lower fabric piece 15 therethrough being defined between the bed 2 and the throat plate 4, and the guide plate 21.

The ironing means 19 is primarily composed of an ultrasonic generator 32 which will be described later on. The ultrasonic generator 32 has a casing 33 and an ultrasonic horn 34 projecting from an end of the casing 33.

A support block 35 is attached to the end of the casing 33. The bed 2 supports thereon a substantially U-shaped support base 36 including a righthand arm on which an air cylinder 37 for the ultrasonic generator is mounted. The cylinder 37 has a rod 38 with the support block 35 attached to the distal end thereof. When the cylinder 37 is expanded and contracted, the ultrasonic generator 32 is movable back and forth to move the tip end of the ultrasonic horn 34 back and forth while confronting the wall 27 of the fabric opening member 24 of the guide means 18. The tip end of the ultrasonic horn 34 serves as a heating tip 34a disposed in confronting relation to the wall 27 of the fabric opening member 24.

A rotatable roller 40 serving as an anvil is rotatably supported by a screw 41 (FIG. 4) in the fabric opening member 24 in its region faced by the heating tip 34a of the ultrasonic horn 34. The rotatable roller or the anvil 40 is disposed in a cavity 42 defined in the wall 27 of the fabric opening member 24, and partly projects from the surface of the wall 27.

Operation of the sewing machine thus constructed will be described below with reference to FIGS. 2 through 5.

The upper and lower fabric pieces 14, 15 to be sewn or stitched together are placed on the bed 2, with the upper fabric piece 14 over the guide plate 21 and the lower fabric piece 15 beneath the guide plate 21. When the sewing machine is operated with the upper and lower fabrics being moved in a direction indicated by an arrow in FIG. 4, the upper and lower fabric pieces 14, 15 are stitched by the sewing needle 6 as it moves up and down while the fabric pieces 14, 15 are being pressed by the presser foot 8 in the opening 22 of the guide means 18. Thereafter, a stitched seam or stitched portion 16 of the upper and lower fabric pieces 14, 15 passes through the groove 26. At this time, the upper and lower fabric pieces 14, 15 are progressively opened or spread apart near the seam 16 by the fabric opening member 24, whereas stitched margins 14a, 15a of the upper and lower fabric pieces 14, 15 are also progressively opened or spread apart by the margin opening member 25 until the stitched margins 14a, 15a are folded upwardly and downwardly from the seam 16.

Then, the tip end of the ultrasonic horn 34 of the ultrasonic generator 32 is held against the stitched region of the upper and lower fabric pieces 14, 15 so that the stitched region thereof near the margins 14a, 15a is pressed against the wall 27 of the fabric opening member 24. When the ultrasonic generator 32 is energized, it applies heat to the stitched region of the fabric pieces 14, 15 to crease them. As the stitched region of the fabric pieces 14, 15 moves on, the rotatable roller 40 is rotated thereby.

A fabric feeder disposed behind the area where the sewing needle 6 moves up and down will now be described in detail.

As shown in FIGS. 1 through 4, the fabric feeder includes an upper piece feeder unit 44 for feeding the upper fabric piece 14 and a lower piece feeder unit 45 for feeding the lower fabric piece 15. The upper piece feeder unit 44 is disposed above the fabric opening member 24 of the guide means 18 and includes an inclined base plate 46 with its front end directed downwardly. A drive roller 47 and a driven roller 48 have respective shafts 47a, 48a rotatably supported on the rear and front ends, respectively, of the base plate 46, and an endless fabric feed belt 49 serving as a fabric feed member is trained around the rollers 47, 48. The fabric feed belt 49 has a lower straight run lying substantially on and along the upper surface of the fabric opening member 24.

The base plate 46 is mounted on rods 52 of an upper piece feeder cylinder 51 which comprises an air cylinder attached to the back of the arm 3 by a support plate 50. The base plate 46 is vertically movable in response to expansion and contraction of the cylinder 51.

The lower piece feeder unit 45 is disposed below the fabric opening member 24 and includes an inclined base plate 54 with its front end directed downwardly. A drive roller 55 and a driven roller 56 have respective shafts 55a, 56a rotatably supported on the rear and front ends of the base plate 54, and an endless fabric feed belt 57 serving as a fabric feed member is trained around the rollers 55, 56. The fabric feed belt 57 has a lower straight run lying substantially on and along the lower surface of the fabric opening member 24.

The base plate 54 is mounted on a rod 60 of a lower piece feeder cylinder 59 which comprises an air cylinder installed on the bed 2. The base plate 54 is movable back and forth in response to expansion and contraction of the cylinder 59.

The fabric feed belts 49, 57 of the feeder units 44, 45 can be rotated by a power transmission means 62 described below.

Figure 6:
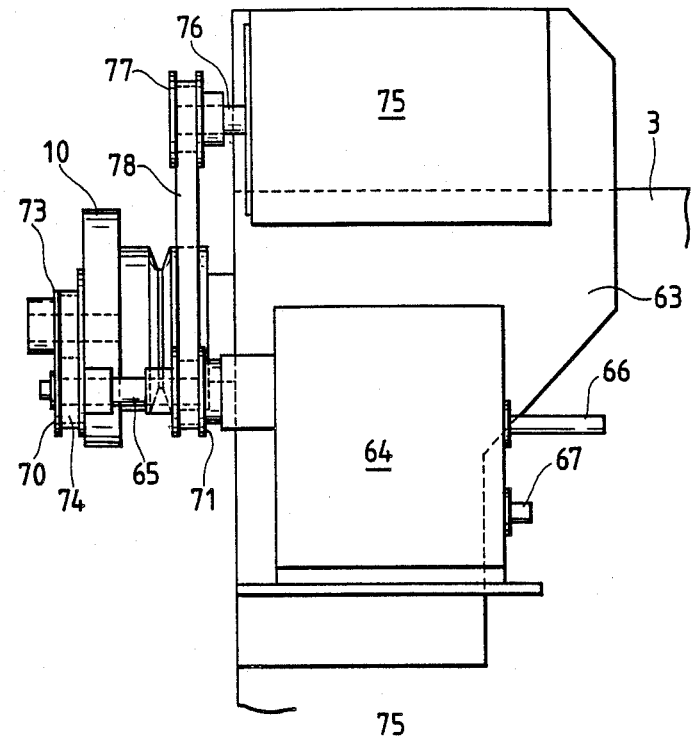
FIG. 6 is a rear elevational view of a fabric feed drive motor and related parts according to the first embodiment of this invention.
Figure 7:
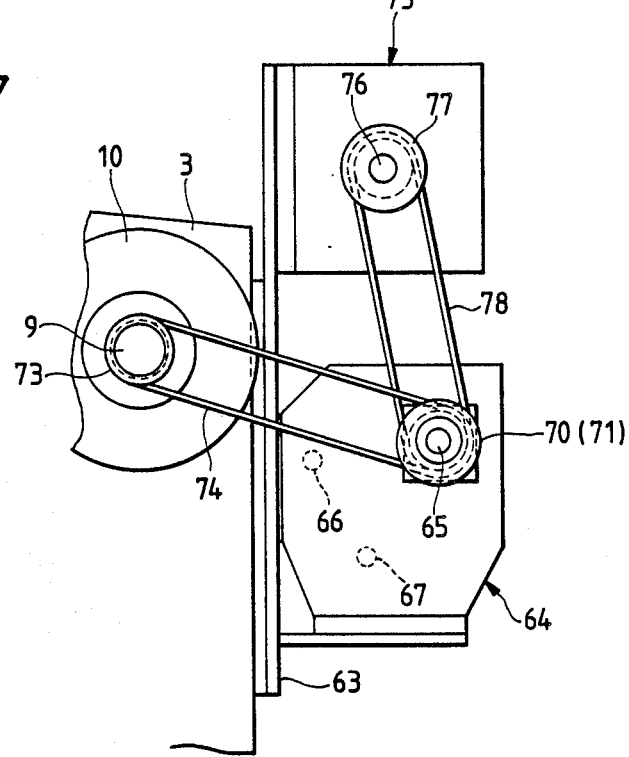
FIG. 7 is a side elevational view showing the fabric feed driver motor and related parts according to the first embodiment of this invention.

The power transmission means 62 is interlinked to the main shaft 9 for rotating the fabric feeder belts 49, 57 of the feeder units 44, 45. As shown in FIGS. 6 and 7, the power transmission means 62 primarily includes a speed reducer 64 mounted on a rear side of the arm 3 by an attachment plate 63. The speed reducer 64 has a single input shaft 65 and upper and lower output shafts 66, 67. The speed reducer 64 transmits rotation of the input shaft 65 as opposite intermittent rotations to the upper and lower output shafts 66, 67 at a reduced speed.

A first input pulley 70 and a second input pulley 71 are mounted on the input shaft 65. Another pulley 71 are mounted on the input shaft 65. Another pulley 73 aligned with the first input pulley 70 is mounted on the end of the main shaft 9 which projects out of the pulley 10. A transmission belt 74 is trained around the pulleys 73, 70.

A fabric feed drive motor 75 serving as an actuator is mounted on an upper portion of the attachment plate 63. The fabric feed motor 75 has an output shaft 76 on which an output pulley 77 is mounted. A fabric feed drive belt 78 is trained around the output pulley 77 and the second input pulley 71.

Figure 8:
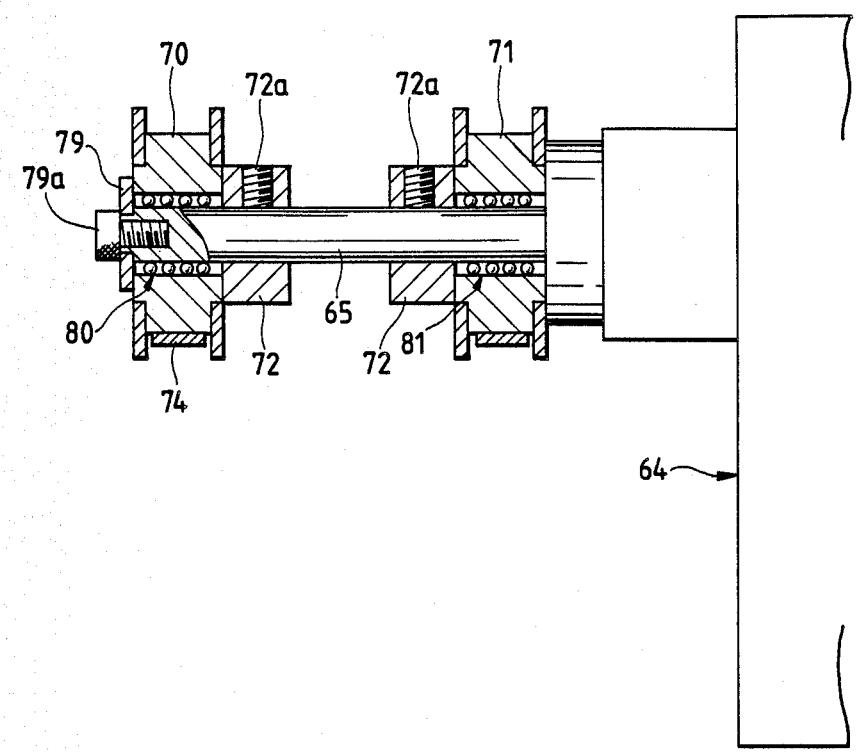
FIG. 8 is a cross-sectional view showing input pulleys of a speed reducer according to the first embodiment of this invention.

The first and second pulleys 70, 71 is mounted on the input shaft 65 through respective one-way clutches 80, 81 serving as clutch means, as shown in FIG. 8. Setting collars 72 positioned against the confronting surfaces of the input pulleys 70, 71 are fixed to the input shaft 65 by respective set screws 72a. A retaining plate 79 for retaining the first input pulley 70 against removal from the input shaft 65 is attached to the tip end of the input shaft 65 by a screw 79a.

The one-way clutches 80, 81 are intermittently operated as follows: When drive power is applied to the first input pulley 70, the one-way clutch 80 thereof is engaged to rotate the input shaft 65 with the pulley 70, and the rotation of the input shaft 65 disengages the one-way clutch 81 of the second input pulley 71. When drive power is applied to the second input pulley 71, the one-way clutch 81 thereof is engaged to rotate the input shaft 65 with the pulley 71, and the rotation of the input shaft 65 disengages the one-way clutch 80 of the first input pulley 70.

The output shafts 66, 67 of the speed reducer 64 are connected to coupling shafts 84, respectively, through universal joints 83. Slidable shafts 85 are slidably fitted in and splined to the respective coupling shafts 84, and also connected to the shafts 47a, 55a, respectively of the drive rollers 47, 55 through respective universal joints 86. Therefore, the rotation of the output shafts 66, 67 is transmitted to the drive rollers 47, 55, respectively, of the fabric feeder units 44, 45. The speed reduction ratio of the speed reducer 64 is selected such that the fabric feed belts 49, 57 are rotated by the respective drive rollers 47, 55 in synchronism with sewing operation of the sewing machine.

When the main shaft 9 is rotated by the sewing machine driving motor 11, the sewing needle 6 moves up and down to stitch or sew the upper and lower fabric pieces 14, 15 to each other. At the same time, the upper and lower fabric pieces 14, 15 are opened or spread apart along the seam 16 by the guide means 18, and they are pressed or creased by the ironing means 19.

Upon rotation of the main shaft 9 during the sewing process, the drive power from the motor 11 is applied to the first input pulley 70 through a belt transmission mechanism which mainly comprises the transmission belt 74. The oneway clutch 80 of the first input pulley 70 is now engaged to rotate the input shaft 65, and the one-way clutch 81 of the second input pulley 71 is disengaged. Stated otherwise, the drive power path from the main shaft 9 is connected to the input shaft 65, and the drive power path from the fabric feed drive motor 75 is disconnected from the input shaft 65.

When the output shafts 66, 67 of the speed reducer 64 are rotated by the input shaft 65 thereof, the drive power from the output shafts 66, 67 is transmitted to the drive rollers 47, 55 of the fabric feeder units 44, 45 through the universal joints 83, the coupling shafts 84, the slidable shafts 85, and the universal joints 86. In synchronism with the sewing operation of the sewing machine, therefore, the fabric feed belts 49, 57 of the upper and lower fabric piece feeder units 44, 45 are rotated clockwise and counterclockwise, respectively, in FIG. 2.

The fabric feed belts 49, 57 feed the stitched region of the upper and lower fabric pieces 14, 15 in the rearward direction while pressing the stitched region against the fabric opening member 24 of the guide means 18.

When the fabric pieces are stitched up to their ends at the area where the sewing needle 6 moves up and down, the sewing machine is shut off, and an automatic thread cutter is operated to cut off the upper and lower threads. As the automatic thread cutter is operated, the main shaft 9 of the sewing machine is slightly rotated.

When the upper and lower fabric pieces 14, 15 are further fed along until the margins thereof are completely pressed or creased up to the ends, i.e., without being stitched, the fabric feed drive motor 75 is energized.

Upon rotation of the output shaft 76 of the fabric feed drive motor 75, the drive power thereof is applied to the second input pulley 71 through a belt transmission mechanism which mainly comprises the fabric feed drive belt 78. Then, the one-way clutch 81 of the second input pulley 71 is engaged to rotate the input shaft 65 with the second input pulley 71, and the one-way clutch 80 of the first input pulley 70 is disengaged. Accordingly, the drive power path from the fabric feed drive motor 75 is connected to the input shaft 65, and the drive power path from the main shaft 9 is disconnected from the input shaft 65.

The upper and lower fabric pieces 14, 15 are therefore fed all the way without letting the sewing machine effect a idling sewing process. At the same time that the upper and lower fabric pieces 14, 15 are fed along, they are opened or spread apart by the guide means 18, and pressed or creased by the ironing means 19.

Figure 9:
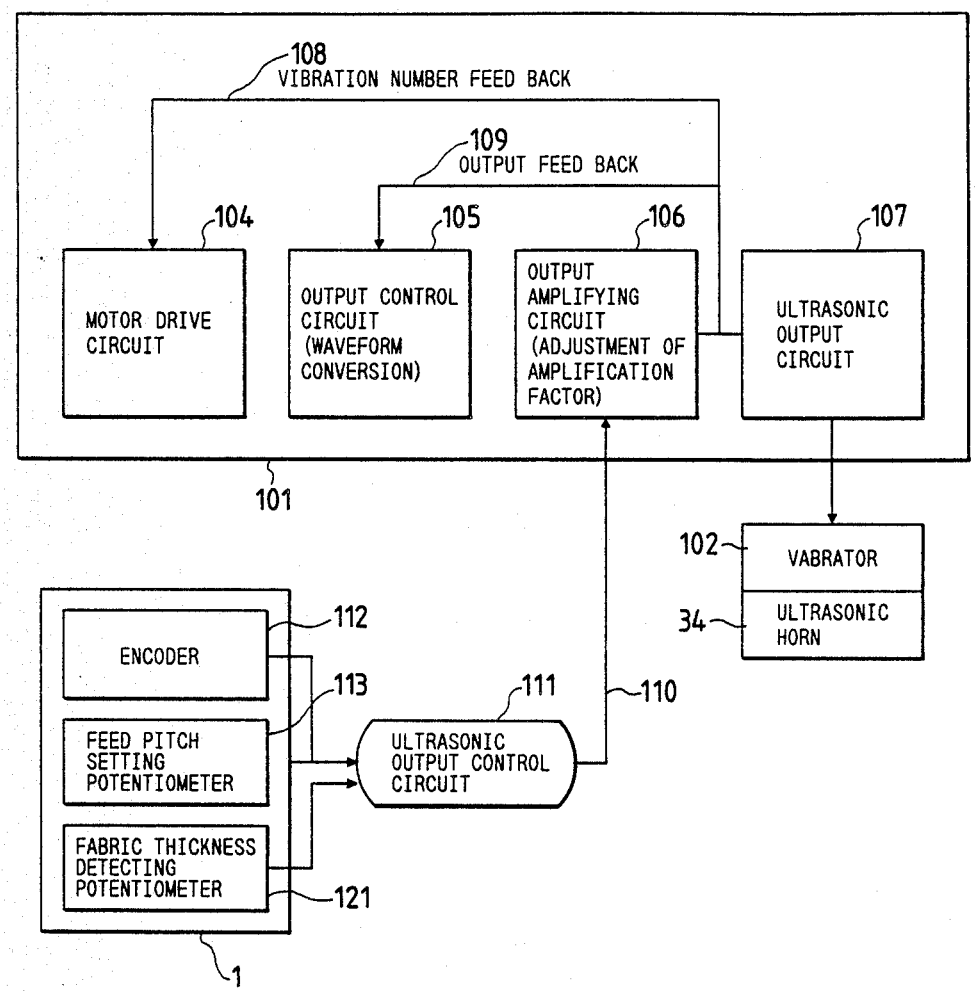
FIG. 9 is a block diagram showing an ultrasonic generator and means for controlling the generator according to the first embodiment of this invention.

The ultrasonic generator 32 and its control circuit according to the first embodiment of this invention will be described below with reference to FIG. 9. This control circuit serves as means for controlling heating energy in the ultrasonic heating means such as the ultrasonic horn and the anvil in accordance with the variation of total thicknesses of the upper and lower fabric pieces.

The ultrasonic generator 32 includes a high-frequency oscillator 101 for generating high-frequency electric energy, a resonant magnetostrictive vibrator 102 for converting the high-frequency electric energy to an ultrasonic wave, and the ultrasonic horn 34 for transmitting the ultrasonic wave while amplifying the magnitude thereof.

The high-frequency oscillator 101 includes a highfrequency signal oscillating circuit 104, an output control circuit 105, output amplifying circuit 106, and an ultrasonic output circuit 107. The high-frequency signal oscillating circuit 104 is adapted for generating a high-frequency signal of rectangular pulses having the frequency of an ultrasonic wave to be generated. The output control circuit 105 is adapted for frequency-dividing the highfrequency signal generated by the high-frequency signal oscillating circuit 104 into a signal of a predetermined frequency. Further, the circuit 105 converts the signal into a sine-wave signal, for example, amplifying the sinewave signal, and outputs the amplified sine-wave signal. The output amplifying circuit 106 is adapted for amplifying the power of the sine-wave signal. The ultrasonic output circuit 107 is adapted for converting the power of the sine-wave signal from the output amplifying circuit 106 to a power level for outputting an ultrasonic wave, and for supplying the converted power to the vibrator 102.

The frequency of the sine-wave signal from the output amplifying circuit 106 is monitored through a frequency feedback loop 108 by the high-frequency signal oscillating circuit 104. If the frequency thus fed back deviates from a preset frequency, then the frequency of the sine-wave signal is automatically controlled so that it will be adjusted to the preset frequency. The amplification factor of the output amplifying circuit 106 is monitored by the output control circuit 105 through an output feedback loop 109. If the amplification factor thus fed back deviates from a preset amplification factor, then the amplification factor is controlled so as to be adjusted to the preset amplification factor.

The amplification factor of the output amplifying circuit 106 is controlled by a control signal 110 so that it can be adjusted depending on the fabric thickness detected by a fabric thickness detector 120 (FIG. 10) which will be described later.

The control signal 110 is issued from an ultrasonic output control circuit (heating control means) 111. To the ultrasonic output control means 111, there are connected an optical encoder 112 for generating a pulse signal having as many pulses as the number of reciprocating strokes of the sewing needle 6, i.e., the number of stitches made by the sewing needle 6, based on the rotation of the main shaft 9, a potentiometer 113 connected to a feed pitch setting unit for presetting a pitch at which the fabric pieces are to be fed, and a potentiometer 121 connected to a fabric thickness detector 120.

The ultrasonic output control circuit 111 counts stitches made by the sewing needle 6 and detects the position of the sewing needle 6 when the latter is in a lower position, based on the pulse signal from the encoder 112. The ultrasonic output control circuit 111 also detects a preset fabric feed pitch based on the signal from the potentiometer 113, and also detects the thickness of the upper and lower fabric pieces 14, 15 based on the signal from the potentiometer 121.

Figure 10:
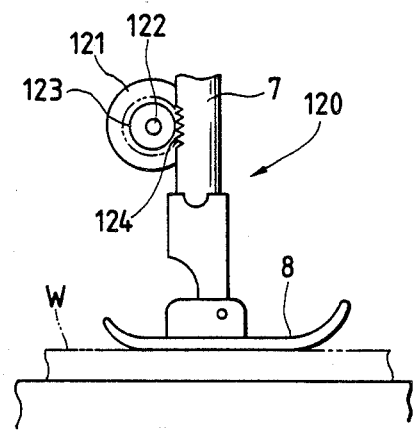
FIG. 10 is an elevational view showing a fabric thickness detector according to the first embodiment of this invention.

As shown in FIG. 10, the fabric thickness detector 120 includes a pinion 123 mounted on a rotatable shaft 122 of the potentiometer 121 which is fixed to a sewing machine frame (not shown), and a rack 124 on the presser bar 7 which is held in mesh with the pinion 123. When the presser bar 7 has moved a distance corresponding to the thickness of a fabric W which comprises the upper and lower fabric pieces 14, 15, the potentiometer 121 generates and applies a signal to the ultrasonic output control circuit 111, which then detects the thickness of the fabric W.

The encoder 112 and the feed pitch setting unit combined with the potentiometer 113 are of general nature, and will not be described in detail.

An operation sequence of the ultrasonic generator 32 in accordance with the first embodiment will be described below with reference to the flowchart of FIG. 11.

Figure 11:
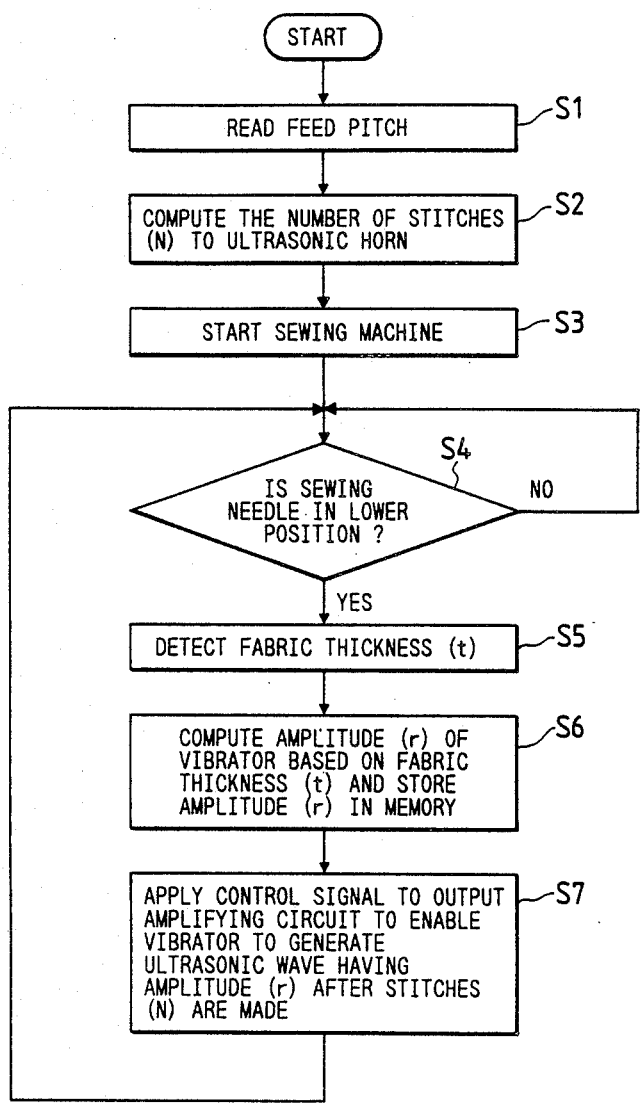
FIG. 11 is a flowchart of a control sequence according to the first embodiment of this invention.

The flowchart of FIG. 11 shows a control process of the ultrasonic output control circuit 111 for controlling the ultrasonic generator 32 to supply the folded margins of the fabric W with the variable amount of heat corresponding to the thickness of the fabric W which has been detected by the fabric thickness detector. The control process will be described below with respect to its successive steps.

In a step S1, the ultrasonic output control circuit 111 reads a preset pitch from a signal received from the potentiometer 113 associated with the feed pitch setting unit. Then, the ultrasonic output control circuit 111 calculates the number of stitches (N) made by the sewing needle 6 from the point where the thickness of the fabric W is detected to the position of the ultrasonic horn 34 based on the read feed pitch in a step S2. The ultrasonic output control circuit 111 applies a start signal to a sewing machine control circuit (not shown) to start operating the sewing machine.

In a step S4, the ultrasonic output control circuit 111 determines whether the sewing needle 6 is in a lower position based on the pulse signal from the encoder 112. The step S4 is effected because when the sewing needle 6 is in the lower position, the thickness of the fabric W can accurately be detected since the feed dog for feeding the fabric W is positioned below the upper surface of the throat plate 4. If the sewing needle 6 is in the lower position, then control goes to a step S5 in which the thickness (t) of the fabric W is calculated based on the signal received from the potentiometer 121 associated with the fabric thickness detector 120.

In a step S6, the ultrasonic output control circuit 111 calculates the amplitude (r) of the vibrator 102 corresponding to an ultrasonic output for suitably ironing the margins of the fabric W folded by the guide means 18, based on the detected thickness (t) of the fabric W, and then stores the calculated amplitude (r) in a memory (not shown).

In a step S7, while the fabric W is being fed from the point where its thickness has been detected toward a position where it will be heated by the ultrasonic generator 32, the ultrasonic output control circuit 111 counts stitches made by the sewing needle 6 based on the pulse signal from the encoder 112, determines that the region of the fabric W which has been detected by the fabric thickness detector 120 has reached the position where the fabric W will be heated by the ultrasonic generator 32 when the count of stitches becomes equal to the number of stitches (N) calculated in the step S2, and applies a control signal to the output amplifying circuit 106 for actuating the vibrator 102 at the amplitude (r). Thereafter, the routine returns to the step S4, and repeats the steps following the step S6.

Even if the fabric W has a stepped portion, the vibrator 102 is automatically controlled so that it produces an ultrasonic wave having an intensity depending on the stepped portion and the produced ultrasonic wave is applied through the ultrasonic horn 34 to the stepped portion of the fabric W.

As described above according to the first embodiment of this invention, the thickness of upper and lower fabric pieces is detected by a fabric thickness detecting means upstream of a point where they will be heated by an ultrasonic heating means, and when the detected region of the upper and lower fabric pieces is fed by a feed means and reaches the heating point, the heating control means applies a heating control signal to the ultrasonic heating means for ironing and heating the fabric pieces depending on the thickness thereof based on the thickness signal from the fabric thickness detecting means. Therefore, even if stitched margins of the upper and lower fabric pieces have a stepped portion, these stitched margins can be ironed in a manner depending on the stepped portion, and reliably be folded back.

A second embodiment according to this invention will next be described. In the first embodiment, heating energy of the ultrasonic heating means is varied in response to the thickness detection signal, so that desirable and uniform ironing can be automatically attained irrespective of the thickness variation of the upper and lower fabrics. On the other hand, in the second embodiment, a distance between an ultrasonic horn and an anvil those constituting the ultrasonic heating means is automatically adjustable depending on the thickness of the fabrics. With such automatic control, advantages similar to that of the first embodiment is also attainable in the second embodiment.

Turning back to FIG. 1, a second embodiment provides a motor 37A instead of the pneumatic cylinder 37 in the first embodiment, and a motor output shaft 38A instead of the cylinder rod 38 of the first embodiment. And the central feature of the second embodiment resides in the controlled energization of the motor 37A.

More specifically, referring to FIG. 1, and similar to the first embodiment, a support block 35 is attached to the end of the casing 33. The bed 2 supports thereon a substantially U-shaped support base 36 including a righthand arm on which the motor 37A is mounted. The motor 37A has an externally threaded output shaft 38A rotatably supported by the support base 36. The support block 35 has a ball screw nut (not shown) threaded over the externally threaded output shaft 38A. Therefore, when the motor 37A is energized, the ultrasonic generator 32 is moved back and forth while the tip end of the ultrasonic horn 34 is facing a wall 27 of the fabric opening member 24 which defines the groove 26, so that the pressure applied to the upper and lower fabric pieces 14, 15 by the ultrasonic horn 34 can be adjusted.

Remaining mechanical constructions in the second embodiment would be substantially identical with those of the first embodiment, and therefore, further description can be neglected.

The second embodiment also provides an ultrasonic generator 32 identical with that of the first embodiment. However, the ultrasonic generator 32 is not subjected to control by the ultrasonic output control circuit 111 as in the case of the first embodiment, but the ultrasonic generator 32 generates a preset electrical power to the vibrator 102 connected to the ultrasonic horn 42.

More specifically, in the second embodiment, instead of the control to the heating energy of ultrasonic horn 42 in the first embodiment, the motor 37A which is connected to the horn 42 is controlled so as to move the latter, to thereby vary the distance between the horn 42 and the anvil 40 in response to the variation of the thickness of the upper and lower fabrics. To attain this, the second embodiment provides a motor control circuit 211 and a motor drive circuit 201 connected thereto.

Figure 13:
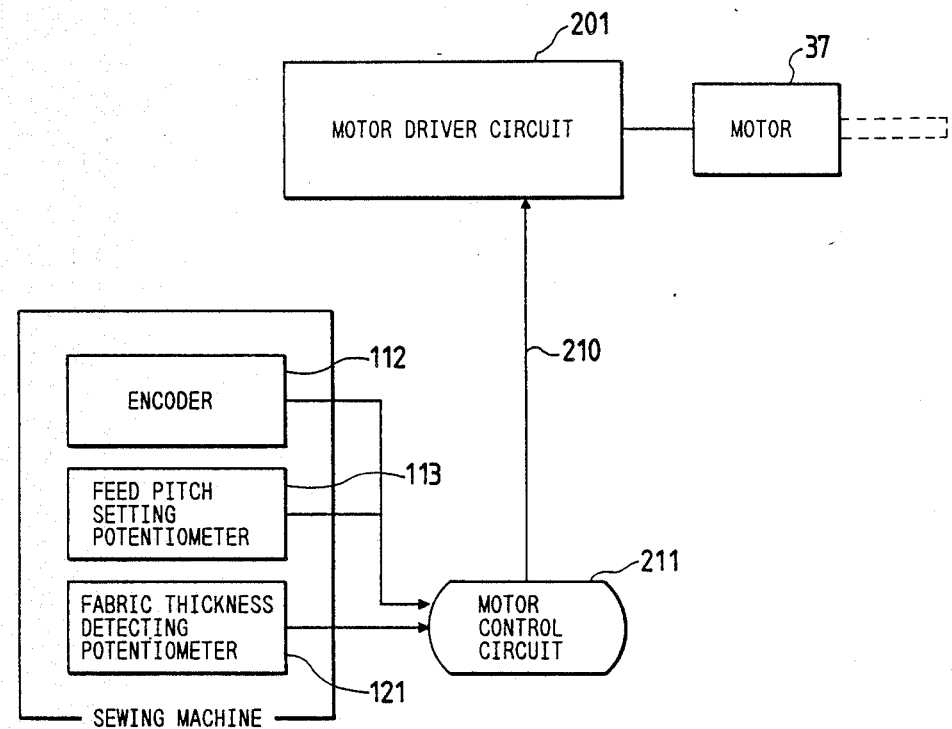
FIG. 13 is a block diagram showing a motor control system according to a second embodiment of this invention.

Controlling the motor 37A for moving the ultrasonic generator 32 back and forth depending on the thickness of the upper and lower fabric pieces 14, 15 will be described with reference to FIG. 13. The motor 37A is supplied with electric power from a motor driver circuit 201 which is connected to the motor control circuit 211 that applies a control signal 210 to the motor driver circuit 201. To the motor control circuit 211, there are connected an optical encoder 112, a potentiometer 113, and a second potentiometer 121. Functions of the encoder 112 and potentiometers 113 and 121 are the same as those in the first embodiment.

The motor control circuit 211 counts stitches made by the sewing needle 6 and detects the position of the sewing needoe 6 when the latter is in a lower position, based on the pulse signal from the encoder 112. The motor control circuit 211 also detects a preset fabric feed pitch based on the signal from the potentiometer 113, and also detects the thickness of the upper and lower fabric pieces 14, 15 based on the signal from the potentiometer 121.

A fabric thickness detector 120 employed in the first embodiment is also used in the second embodiment. When the presser bar 7 has moved a distance corresponding to the thickness of a fabric W which comprises the upper and lower fabric pieces 14, 15, the potentiometer 121 generates and applies a signal to the motor control circuit 211, which then detects the thickness of the fabric W.

An operation sequence of the ultrasonic generator 32 according to the second embodiment of this invention will be described below with reference to the flowchart shown in FIG. 12.

Figure 12:
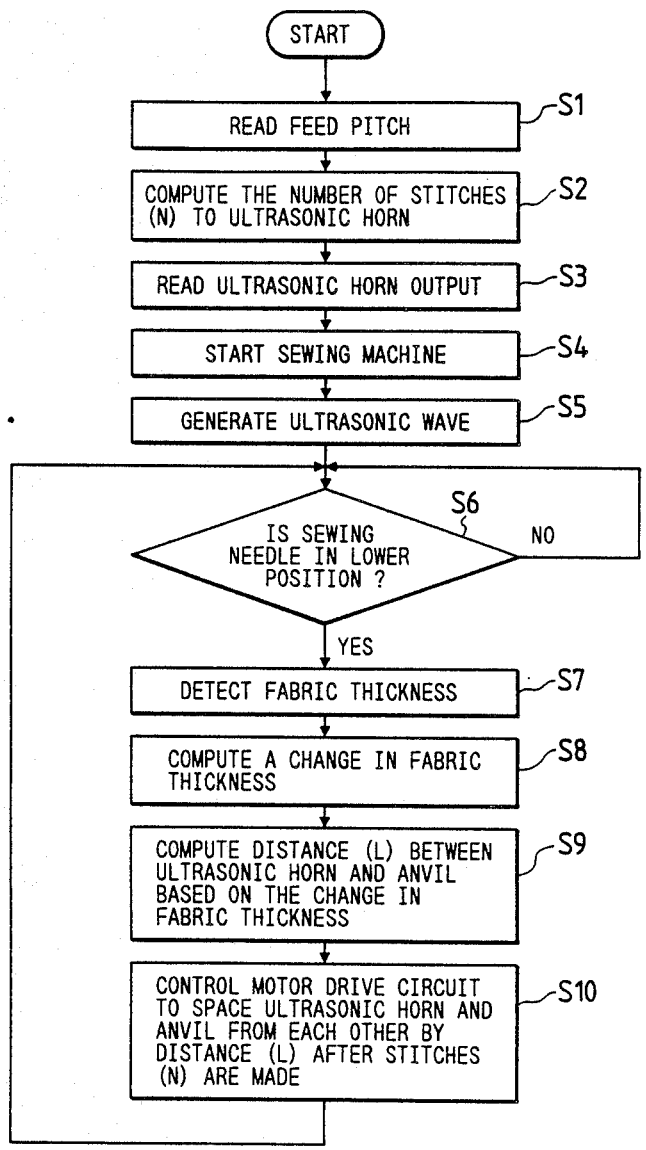
FIG. 12 is a flowchart of a control sequence according to a second embodiment of this invention.

The flowchart of FIG. 12 shows a control process of the motor control circuit 211 for controlling the motor 37A to adjust the distance between the anvil and the ultrasonic horn based on the thickness of the fabric W which has been detected by the fabric thickness detector. The control process will be described below with respect to its successive steps.

In a step S1, the motor control circuit 211 reads a preset pitch from a signal received from the potentiometer 113 associated with the feed pitch setting unit. Then, the motor control circuit 211 calculates the number of stitches (N) made by the sewing needle 6 from the point where the thickness of the fabric W is detected to the position of the ultrasonic horn 34 based on the read feed pitch in a step S2. The motor control circuit 211 reads an output value from an output setting means (not shown) in a step S3, which output value corresponds to the intensity of an ultrasonic wave generated by the ultrasonic horn 34. Then, the motor control circuit 211 applies a start signal to a sewing machine control circuit (not shown) to start operation of the sewing machine.

The motor control circuit 211 then applies an ultrasonic wave output signal to the ultrasonic generator 32 to enable the same to generate an ultrasonic wave in a step S5. In a step S6, the motor control circuit 211 determines whether the sewing needle 6 is in a lower position based on the pulse signal from the encoder 112. The step S6 is effected because when the sewing needle 6 is in the lower position, the thickness of the fabric W can accurately be detected since the feed dog for feeding the fabric W is positioned below the upper surface of the throat plate 4. If the sewing needle 6 is in the lower position, then control goes to a step S7 in which the thickness of the fabric W is calculated based on the signal received from the potentiometer 121 associated with the fabric thickness detector 120. In a step S8, the motor control circuit 211 calculates the difference between the thickness of the fabric W which is calculated in a present cycle and the thickness of the fabric W which has been calculated in a preceding cycle. Then, the motor control circuit 211 calculates the distance (L) between the ultrasonic horn 34 and the anvil 40 based on the difference between the thicknesses of the fabric W in a step S9. In a step S10, while the fabric W is being fed from the point where its thickness has been detected toward a position where it will be heated by the ultrasonic generator 32, the motor control circuit 211 counts stitches made by the sewing needle 6 based on the pulse signal from the encoder 112, determines that the region of the fabric W which has been detected by the fabric thickness detector 120 has reached the position where the fabric W will be heated by the ultrasonic generator 32 when the count of stitches becomes equal to the number of stitches (N) calculated in the step S2, and the applies a control signal to the motor driver circuit 201 for energizing the motor 37A to space the ultrasonic horn 34 from the anvil 40 by the distance (L). Thereafter, control returns to the step S6, and repeats the steps following the step S6.

Even if the fabric W has a stepped portion or the fabric thickness varies due to a different type of fabric used, since the distance between the ultrasonic horn 34 and the anvil 40 is automatically adjusted depending on the fabric thickness, the fabric W can smoothly be fed between the ultrasonic horn 34 and the anvil 40. Therefore, the pressure applied to the stitched margins of the fabric by the ultrasonic horn 34 is optimized irrespective of the change in fabric thickness, so that the stitched margins of the upper and lower fabric pieces 14, 15 will effectively be ironed.

In view of the above, according to the second embodiment of this invention, the thickness of upper and lower fabric pieces is detected by a fabric thickness detecting means upstream of a point where they will be heated by an ultrasonic heating means, and when the detected region of the upper and lower fabric pieces is fed by a feed means and reaches the heating point, the distance between an ultrasonic horn and an anvil is automatically adjusted by a distance adjusting means which is controlled by a control means based on a thickness signal from the fabric thickness detecting means. Therefore, even if stitched margins of the upper and lower fabric pieces have a stepped portion or their thickness varies due to a different type of fabric used, the fabric pieces are not caught between the ultrasonic horn and the anvil, are prevented from being overheated and burned, and are ironed under a suitable pressure.

Accordingly, in the present invention, since control means is provided for controlling one of the heating energy of the heating means and distance between the horn and anvil of the heating means in accordance with the detected combined thickness of the upper and lower fabrics, uniform heating and ironing are automatically attainable with respect to the folded stitched fabric margins irrespective of the variation of the thickness.

While the invention has been described in detail and with reference to specific embodiments thereof, it would be apparent for those skilled in the art that various changes and modifications can be made therein without departing from the spirit and scope of the invention.

What is claimed is:

1. In a sewing machine including:
   stitching means for stitching upper and lower fabric pieces;
   feed means for feeding the upper and lower fabric pieces which are stitched together;
   a guide means for folding back, away from each other, stitched margins of the upper and lower fabric pieces fed by the feed means, the guide means being disposed downstream of a point where the upper and lower fabric pieces are stitched by the stitching means with respect to the direction in which the upper and lower fabric pieces are fed by the feed means; and
   ultrasonic heating means for ironing the stitched margins of the fabric pieces which have been folded back by the guide means, the improvement comprising:

fabric thickness detecting means for detecting the thickness of the upper and lower fabric pieces upstream of a point where the upper and lower fabric pieces are heated by the ultrasonic heating means, and for producing a thickness signal representing the detected thickness;

determining means for producing a determining signal when a region of the upper and lower fabric pieces which has been detected by the fabric thickness detecting means is fed by the feed means and reaches the point where the upper and lower fabric pieces are heated by the ultrasonic heating means; and control means responsive to the determining signal for producing a control signal to iron and heat the upper and lower fabric pieces depending on the thickness thereof based on the thickness signal from the fabric thickness detecting means and for applying the control signal to the ultrasonic heating means.

2. The improvement according to claim 1, wherein the ultrasonic heating means comprises:
an ultrasonic horn, and
an anvil positioned in confrontation with the ultrasonic horn, the upper and lower fabric pieces passing through a space defined by the ultrasonic horn and the anvil.

3. The improvement according to claim 2, wherein the ultrasonic heating means further comprises a high-frequency oscillator connected to the ultrasonic horn for supplying electrical power thereto, the control means supplying the control signal to the high-frequency oscillator for changing the electrical power in response to the thickness signal, to thereby change heating energy produced by the ultrasonic horn and the anvil depending on the thickness.

4. The improvement according to claim 2, wherein the ultrasonic heating means further comprises drive means for moving one of the ultrasonic horn and the anvil to change a distance therebetween, and wherein the control means supplies the control signal to the drive means for changing the distance in response to the thickness signal.

5. The improvement according to claim 4, wherein the ultrasonic heating means further comprises a high frequency oscillator connected to the ultrasonic horn, the high frequency oscillator supplying a constant power to the ultrasonic horn.

6. The improvement according to claim 4, further comprising:
calculating means for calculating a change in the thickness of the upper and lower fabric pieces based on the thickness signal from the fabric thickness detecting means; and
memory means for storing the calculated change in the thickness, the control means responsive to the determining signal for reading the change in the thickness from the memory means and controlling with the drive signal the drive means based on the change in the thickness to vary the distance between the anvil and the ultrasonic horn.

7. In a sewing machine including:
stitching means for stitching upper and lower fabric pieces;
feed means for feeding the upper and lower fabric pieces which are stitched together;
a guide means for folding back, away from each other, stitched margins of the upper and lower fabric pieces fed by the feed means, the guide means being disposed downstream of a point where the upper and lower fabric pieces are stitched by the stitching means with respect to the direction in which the upper and lower fabric pieces are fed by the feed means; and
ultrasonic heating means for ironing the stitched margins of the fabric pieces which have been folded back by the guide means, the improvement comprising:
the ultrasonic heating means including an anvil and an ultrasonic horn, the horn and the anvil providing a space therebetween for allowing the upper and lower fabric pieces to pass therethrough;
distance adjusting means for adjusting the distance between the anvil and the ultrasonic horn depending on the thickness of the upper and lower fabric pieces;
fabric thickness detecting means for detecting the thickness of the upper and lower fabric pieces upstream of a point where the upper and lower fabric pieces are heated by said ultrasonic heating means, and for producing a thickness signal representing the detected thickness;
calculating means for calculating a change in the thickness of the upper and lower fabric pieces based on the thickness signal from the fabric thickness detecting means;
memory means for storing the calculated change in the thickness;
determining means for producing a determining signal when a region of the upper and lower fabric pieces which has been detected by the fabric thickness detecting means is fed by the feed means and reaches the point where the upper and lower fabric pieces are heated by the ultrasonic heating means; and
control means responsive to the determining signal for reading the change in the thickness from the memory means and controlling the distance adjusting means based on the change in the thickness to vary the distance between the anvil and the ultrasonic horn.

* * * * *